United States Patent [19]

Ohsawa

[11] Patent Number: 4,907,076
[45] Date of Patent: Mar. 6, 1990

[54] COLOR BALANCE PROCESSING APPARATUS WHEREIN COLOR COMPONENT SIGNALS ARE CORRECTED THROUGH COMPARISON WITH A REFERENCE VALUE

[75] Inventor: Hidefumi Ohsawa, Urawa, Japan

[73] Assignee: Canon Kabushiki Kaisha, Tokyo, Japan

[21] Appl. No.: 366,213

[22] Filed: Jun. 15, 1989

Related U.S. Application Data

[63] Continuation of Ser. No. 300,728, Jan. 25, 1989, abandoned, which is a continuation of Ser. No. 923,639, Oct. 27, 1986, abandoned.

[30] Foreign Application Priority Data

Oct. 29, 1985 [JP] Japan ................................ 60-240364

[51] Int. Cl.$^4$ ........................ H04N 1/40; H04N 1/46
[52] U.S. Cl. ........................................ 358/80; 358/29
[58] Field of Search ............................ 358/80, 29 C, 29

[56] References Cited

U.S. PATENT DOCUMENTS

| | | |
|---|---|---|
| 557,940 | 12/1883 | Hashimoto . |
| 3,800,079 | 3/1974 | McNeil et al. ...................... 178/7.1 |
| 4,136,360 | 1/1979 | Hoffrichter et al. .................. 358/80 |
| 4,219,841 | 8/1980 | Nishimura et al. ............... 358/29 C |
| 4,328,515 | 5/1982 | Wellendorf ........................... 358/80 |
| 4,381,520 | 4/1983 | Machida et al. .................. 358/29 C |
| 4,694,502 | 9/1987 | Ozawa et al. ........................ 382/17 |
| 4,734,762 | 3/1988 | Aoki et al. ............................ 358/80 |
| 4,736,241 | 4/1988 | Murakami et al. .................. 358/29 |
| 4,751,567 | 6/1988 | Hashimoto ........................... 358/44 |
| 4,754,323 | 6/1988 | Kaji et al. ............................. 358/44 |

FOREIGN PATENT DOCUMENTS

| | | |
|---|---|---|
| 2545961 | 4/1981 | Fed. Rep. of Germany . |
| 3220298 | 12/1982 | Fed. Rep. of Germany . |
| 1526801 | 10/1978 | United Kingdom . |

OTHER PUBLICATIONS

Elektronische Bilderarbeitung Von A-Z, K. Springstein, 1982, pp. 125-127.

Primary Examiner—James J. Groody
Assistant Examiner—Robert M. Bauer
Attorney, Agent, or Firm—Fitzpatrick, Cella, Harper & Scinto

[57] ABSTRACT

A color image information processing apparatus includes a plurality of color separation circuits for separating input information into image information for the respective colors on the basis of constants and a CPU for comparing the image information for each color with a predetermined value, wherein each separation circuit changes a corresponding constant in accordance with the result of the comparison by the CPU.

31 Claims, 6 Drawing Sheets

COLOR BALANCE PROCESSING APPARATUS WHEREIN COLOR COMPONENT SIGNALS ARE CORRECTED THROUGH COMPARISON WITH A REFERENCE VALUE

This application is a continuation of application Ser. No. 300,728 filed Jan. 25, 1989 which is a continuation of application Ser No. 923,639 filed Oct. 27, 1986, both now abandoned.

BACKGROUND OF THE INVENTION

1. Field of the Invention

The present invention relates to color image processing apparatus such as, for example, digital color copying devices or digital color facsimile devices.

2. Related Background Art

In conventional color image processing apparatus of this type, a color original document is input as three different color signals, so that three different color (red, green and blue) filters are sequentially selected to separate corresponding colors, the corresponding images are scaled down by optical systems and collected on photo receptors such as a one-dimensional CCD to read the color signals.

Recently, a one-dimensional contact-type color sensor is often used in order to increase the quantity of light impinging on a CCD to enhance the S/N ratio, reduce the external dimensions of the color-document reader and facilitate the adjustment of optical systems such as lenses.

As shown in FIG. 2A, the contact-type color sensor includes a total of five CCD chips 200–204, about 50 mm long, arranged in staggered relationship so as to be able to read the 297 mm lateral range of an A-4 sized page. The filters for color separation are formed by putting down three layers of red, green and blue coloring matter on the CCD, as shown in FIG. 2B.

There is the problem that if a sheet of a document is read by those five CCD sensors 200–204, the balance among three colors for the five channels will be lost due to variations in the characteristics of the color separation filters among the five channels, the spectral sensitivity of the photo receptors, etc., thus, colors will vary from channel to channel.

SUMMARY OF THE INVENTION

It is an object of the present invention to provide a color image information processing apparatus which eliminates the above drawback.

It is another object of the present invention to provide a color image information processing apparatus which is capable of adjusting the balance in color among the read elements to obtain balanced color signals.

It is a further object of the present invention to provide a color image information processing apparatus which is capable of automatically adjusting the balance in color among input color image signals.

Other objects of the present invention will be apparent from the drawings and a detailed description to be given hereinafter.

DETAILED DESCRIPTION OF THE PREFERRED EMBODIMENT

One embodiment of the present invention will now be described in more detail.

COLOR COPYING DEVICE (FIG. 1)

Figure 1:
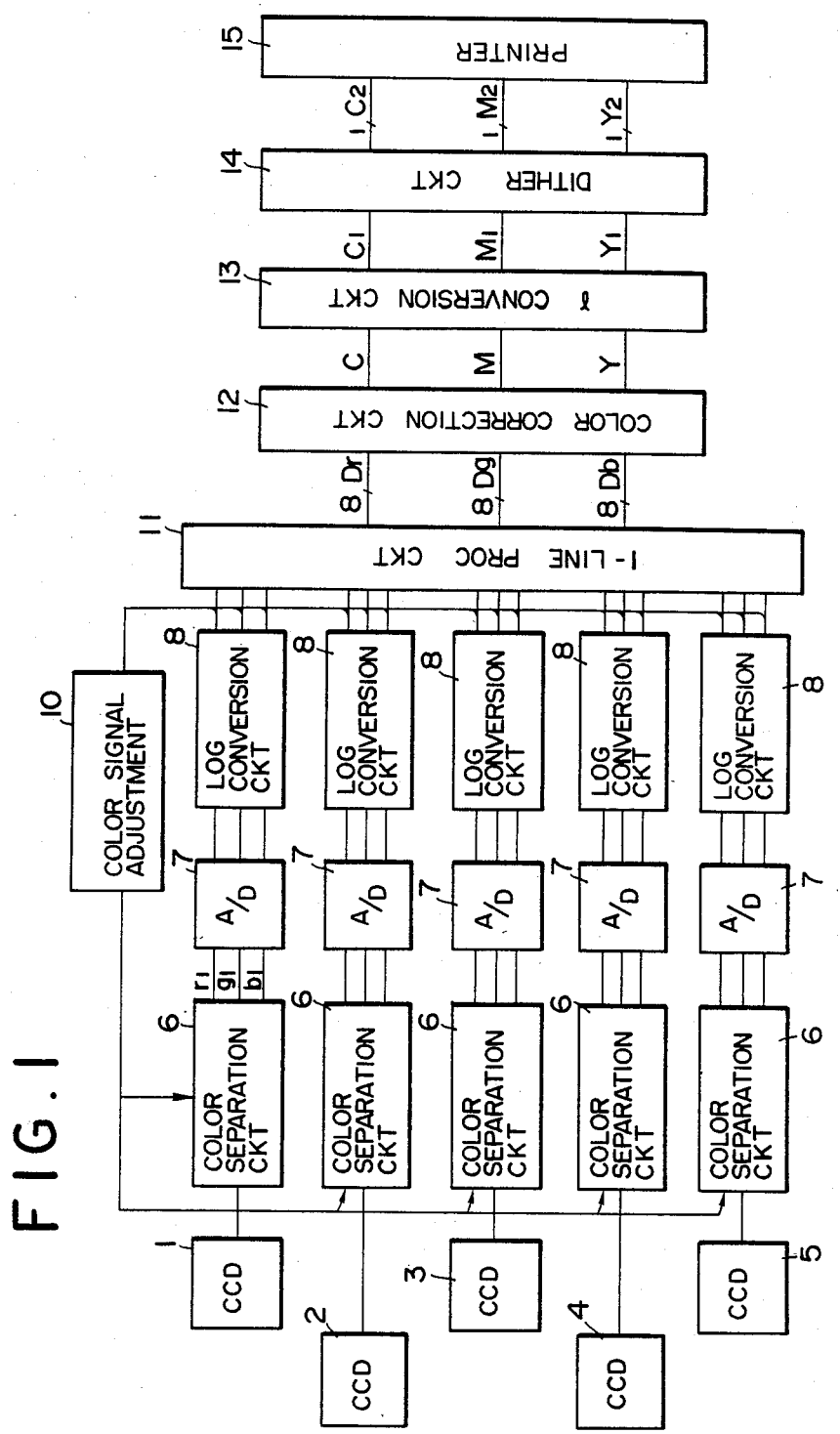
FIG. 1 is a block diagram of a signal processing system of a color copying device which is one embodiment of the present invention.

FIG. 1 is a block diagram of a signal processing system of a color copying device which is one embodiment of the present invention.

Figure 2A:
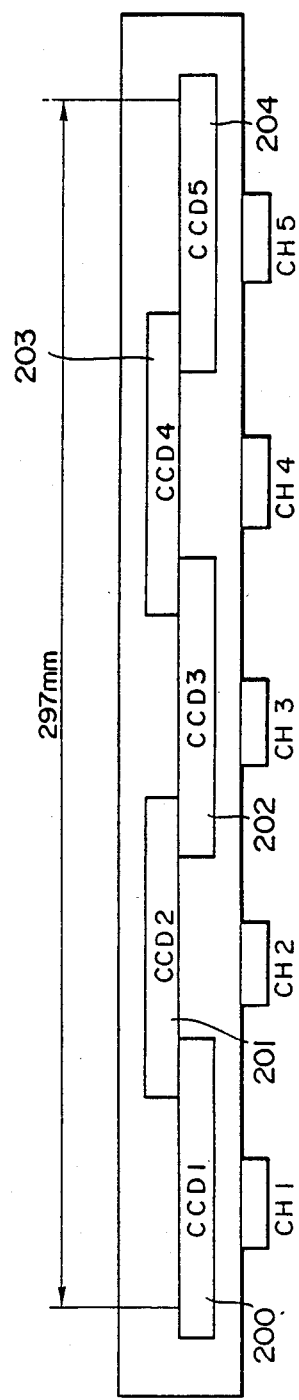
FIG. 2A illustrates a color contact sensor using five CCDs.
Figure 2B:
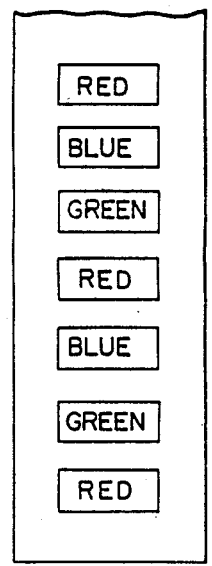
FIG. 2B illustrates r, g and b (red, green, blue) color filters layered on the CCDs.

Reference numerals 1–5 denote five channel CCDs and correspond to reference numerals 201–205 in FIG. 2. The light reflected by an original document is collected on CCDs 1–5 arranged in the main scan direction of the document. The color signals of red, green and blue (to be referred to as the r, g, and b signals hereinafter) from CCDs 1–5 are input in series to color separation circuits 6 and converted to signals having the same phase. Color separation correction is performed in accordance with the following linear matrix Equation (1):

$$\begin{rcases} r_1 = r - \alpha_1 g \\ g_1 = g - \alpha_2 r \\ b_1 = b - \alpha_3 g \end{rcases} \quad (1)$$

The $r_1$, $g_1$ and $b_1$ are converted by A/D converters 7 to corresponding 8-bit digital signals, converted by LOG conversion circuits 8 from intensity data to density data and then input to a one-line processing circuit 11. This circuit 11 corrects the differences in spatial phase among the data from 5 channel CCDs 1–5 due to the disposition of CCDs 1–5 and produces one-line of data including 8-bit Dr, Dg Db density data.

A color correction circuit 12 digitally performs a corrective operation on deviations from the ideal spectral characteristics of three coloring matters of yellow (Y), magenta (M) and cyan (C), used at a printer 15 to form Y, M and C signals. Signal γ conversion circuit 13 adjusts the balance of a grey color obtained by overlapping three colors Y, M and C to output $Y_1$, $M_1$ and $C_1$ signals. A dither circuit 14 performs halftone processing to supply to printer 15 one-bit data $Y_2$, $M_2$ and $C_2$ corresponding to the presence/absence of a dot.

A color signal adjustment device 10 receives 8-bit digital data after LOG conversion, performs an adjustment operation, to be described later, on the data, and returns the result as 8-bit digital data to color separation circuits 6. It can select respective pieces of input data using a selector to adjust color separation circuits 6 for the 5 channels.

COLOR SIGNAL ADJUSTMENT DEVICE (FIGS. 3-5)

Figure 3:
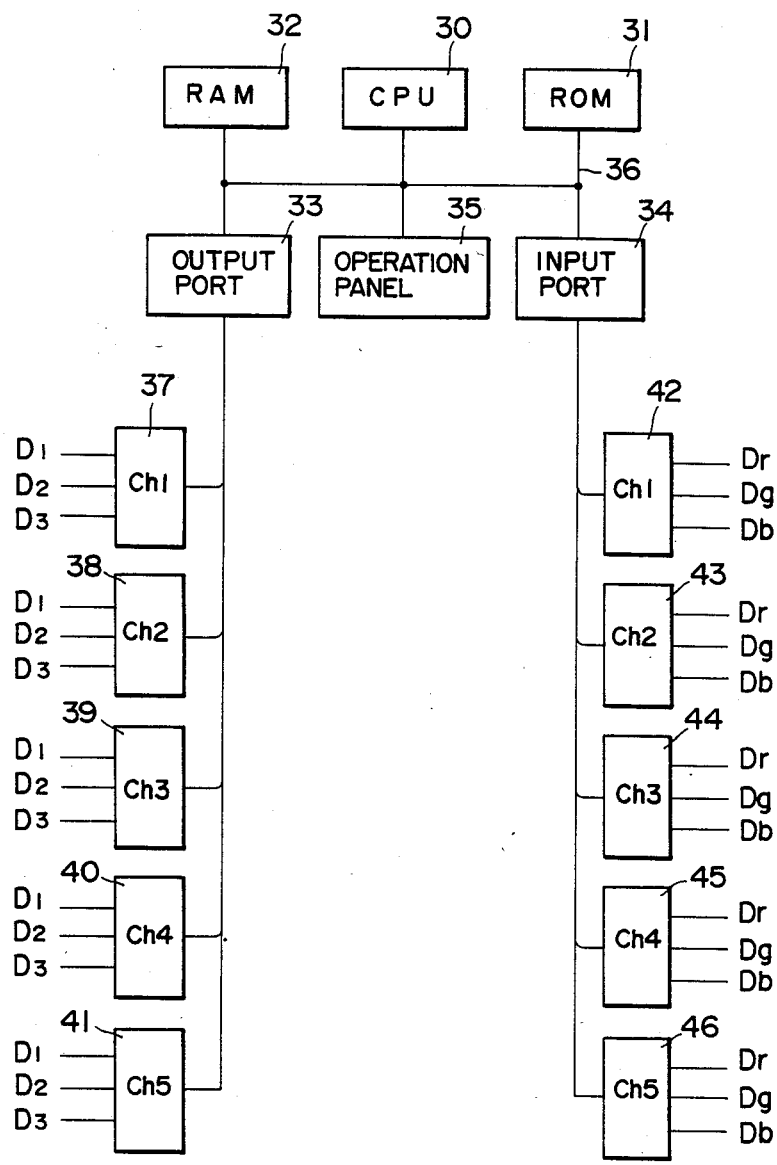
FIG. 3 is a block diagram of a signal adjustment device.

FIG. 3 is a block diagram of one embodiment of color signal adjustment circuit 10.

This circuit includes a CPU 30, a ROM 31 in which an adjustment program, data, etc., are stored, a RAM 32 which stores measured data and calculated data, an output port 33 which outputs an adjustment coefficient data to color separation circuit 6, an input port 34 which receives color signal data from LOG conversion circuit 8, an operation panel 35 and an internal bus 36 connecting these elements. Output and input ports 33 and 34 have output and input terminals 37-41 and 42-46, respectively, connected thereto and corresponding to the channels, whereby the respective input and output data are selectively output and input, respectively.

The adjustment of color signal adjustment device 10 will now be described.

Generally, color density signals $D_r$, $D_g$ and $D_b$ output from LOG conversion circuits 8 are in proportional relationship to the dotted area rate of a color-printed document which is an original document. They are different from each other due to variations in the performance of the color separation filters and in the spectral sensitivity of the CCDs for the five channels. Color adjustment device 10 performs an adjustment operation to limit the differences among these signals and an objective value to within a predetermined range $\pm\epsilon$.

Figure 4B:
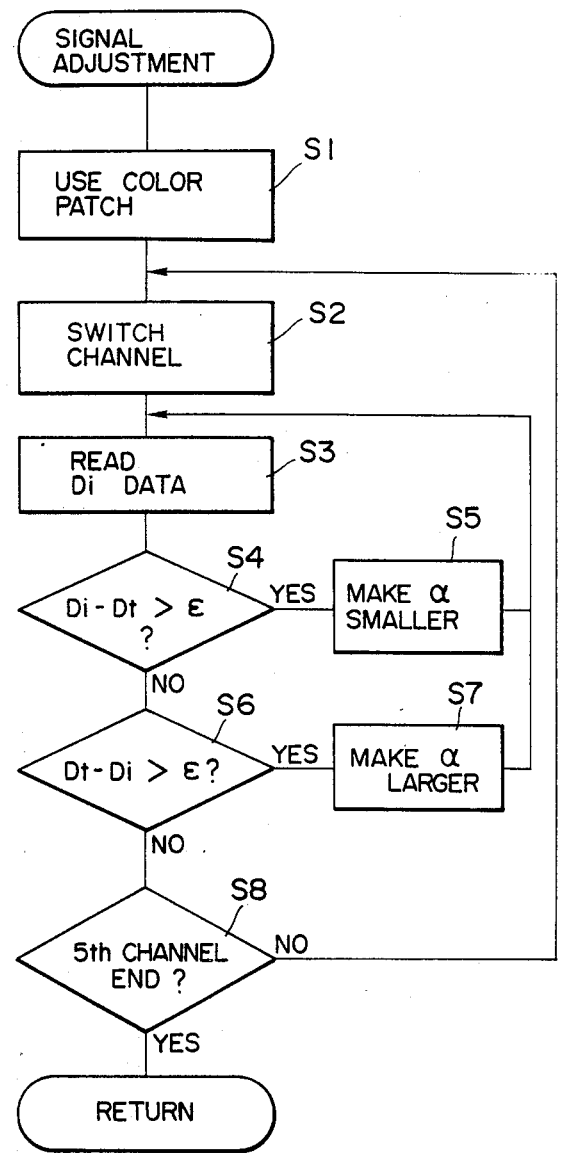
FIGS. 4A and 4B are flowcharts for explaining the adjustment of color signals.
Figure 4A:
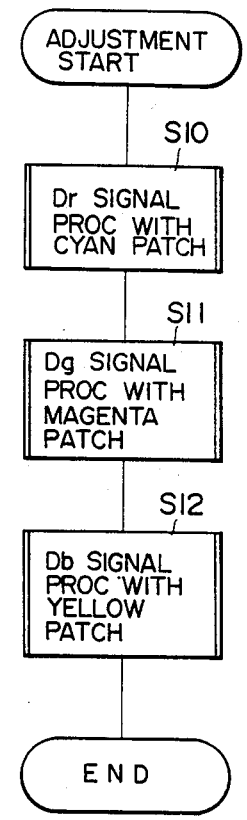

FIG. 4A is a flowchart of a main processing loop including three subroutines of steps S10-12.

At step S10, a r signal is processed with a cyan color patch; at step 11, a g signal with a magenta color patch; and at step 12, a b signal with a yellow color patch.

FIG. 4B is a flow chart of a subroutine for processing color signals shown in FIG. 4A. It should be noted that signals $D_r$, $D_g$ and $D_b$ are generally designated as a signal $D_i$.

Here, adjustment of red density signal $D_r$ will be described. First, at step S1, a color patch of cyan complementary to red is used as an original and the cyan patch is read using CCDs 1-5. At step S2, input port channel 1, shown by reference numeral 42, is selected, and data $D_r$ is input through this channel and the difference between the data and an objective value $D_t$ is calculated (step S3). At step S4, when the measured value is larger than the objective value, control passes to step S5 where data $D_1$-$D_3$ are output so as to make smaller the coefficient α in Equation (1). On the contrary, when at step S6 the measured value is smaller than the objective value, control passes to Step S7 where data to make the coefficient α larger is output to color separation circuit 6. The above operations are looped until the difference falls within $\pm\epsilon$. At step 8, this operation is repeated up to input port channel 5.

Similarly, color patches of magenta and yellow are used for green and blue density signals $E_g$ and $D_b$, respectively, and converged to the corresponding objective values. If the color patch used at this time has a dotted area rate of 90% or so, adjustment will become easy.

Figure 5:
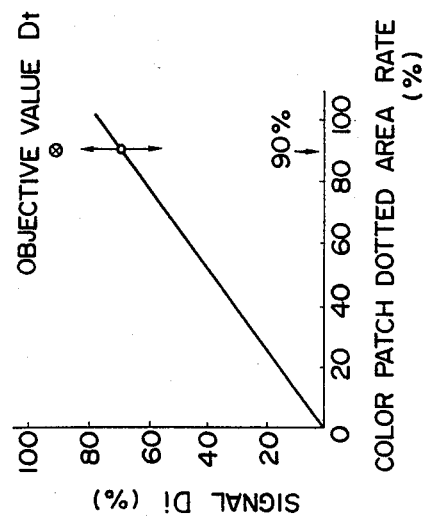
FIG. 5 illustrates the relationship between the document dotted area rate and the Di signal.

FIG. 5 shows the relationship between dotted area (%) of an original document plotted on the abscissa axis and $D_r$, $D_g$ and $D_b$ signals (represented as $D_i$ signal in FIG. 5) plotted on the ordinate axis. The ordinate axis represents the values normalized by a signal required for the printer to form dots on the entire surface of a printing sheet, i.e., the density of the normalizing signal being used as 100%.

In FIG. 5, the direction of changing and adjusting the objective value $D_t$ and coefficient α when the dotted area rate is 90% is indicated by the arrow.

COLOR SEPARATION CIRCUIT (FIG. 6)

Figure 6:
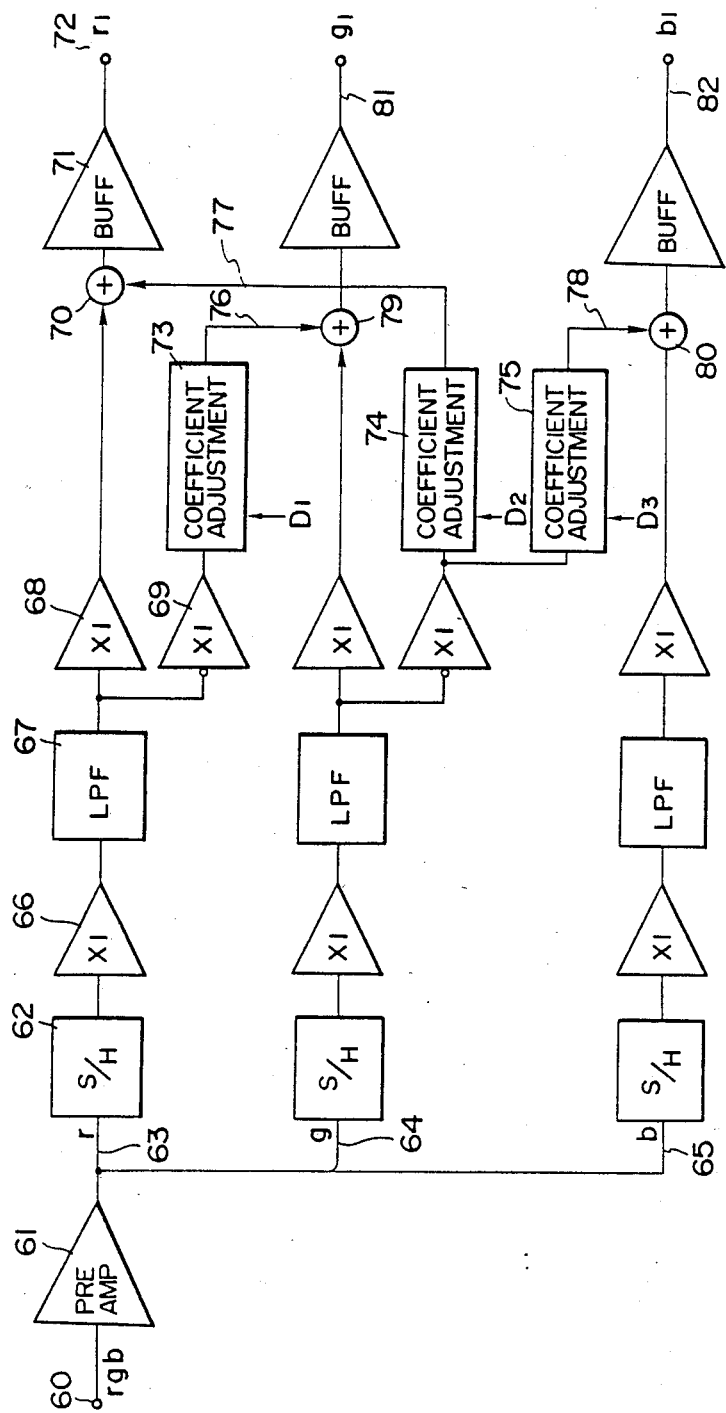
FIG. 6 is a block diagram of a color separation circuit.

FIG. 6 is a block diagram of a color separation circuit 6.

r, g and b signals 60 output serially by CCDs 1-5 are amplified by a preamplifier 61 by a predetermined gain and converted to r, g and b signals 63-65 having the same phase by a sample and hold circuit 62 by changing the sampling timing. Now r, signal 63 will be considered. After signal 63 has passed a buffer 66, noise is removed by a low-pass filter 67. The signal is multiplied by the factors of 1 and $-1$ at multipliers 68 and 69 and subjected at an adder 70 to the matrix calculation shown in Equation (1). The resulting signal is passed through a buffer 71 and delivered as a $r_1$ signal 72 ($r_1 = r - \alpha_1 \cdot g$) to A/D converter 7.

A coefficient adjustment device 73 outputs the coefficient $\alpha_2$ of Equation (1). It receives 8-bit data corresponding to the coefficient $\alpha_2$ by signal $D_1$ from color adjustment device 10 and forms a signal 76 indicative of $-\alpha_2 r$. Similarly, coefficient adjustment devices 74 and 75 form signals 77 and 78 indicative of $-\alpha_1 g$ and $-\alpha_3 g$ using signals $D_2$ and $D_3$, respectively.

In adders 79 and 80, $g_1$ and $b_1$ signals 81 and 82 become $g - \alpha_2 r$ and $b - \alpha_3 g$, respectively.

COEFFICIENT ADJUSTMENT DEVICE (FIG. 7)

Figure 7:
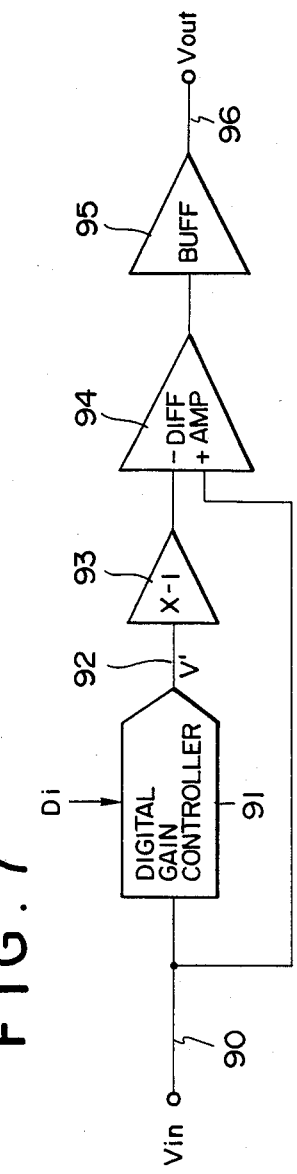
FIG. 7 is a block diagram of a coefficient adjustment device.

FIG. 7 is a detailed block diagram of coefficient adjustment devices 73, 74 and 75.

A digital gain controller 91 (for example, AD 7524 available from Analog Devices Corporation) adjusts the gain on an input voltage Vin 90.

The relationship between the output V' 92 from controller 91 and the input voltage Vin is represented by $V' = V\text{in}/D$ where D is 8-bit data from color signal adjustment device 10. The D and the respective bits $DB_0$-$DB_7$ have the following relationship:

$$\frac{1}{D} = \frac{DB_7}{2} + \frac{DB_6}{2^2} + \ldots + \frac{DB_0}{2^8} \quad (2)$$

Thus if $DB_0$-$DB_7$ are changed in hexadecimal notation between 80 and FF, the gain will be set between 1 and 2. The signal from gain controller 91 is sign-inverted by an inverter 93. A differential amplifier 94 forms the difference between Vin and the signal from inverter 93 and outputs it as a Vout 96 via a buffer 95.

As a result, the input signal Vin 90 and the output signal Vout 96 have the relationship represented by the following Equation:

$$V\text{out} = -\alpha V\text{in} \quad (3)$$

where α is a value between 0 and 1.

In the particular embodiment, the set objective value $D_t$ of a color signal when the complementary color patch is read is fixed. However, it is preferable to reduce the difference between the read signal value of a black patch and the read signal value of complementary-color patch by using black patches whose complementary colors have the same dotted area rate. It is obvious that this is easily realizable by adding to the particular embodiment the sequence of reading the color signal of a black patch.

As described above, according to the particular embodiment, automatic adjustment of the color balance in the color separation circuit renders inconspicuous a deviation of the balance in color among the channels and serves to greatly shorten the time required for the adjustment.

It should be noted that the present invention is not limited to the above embodiment and that various changes and modifications could be made within the scope of the attached claims.

We claim:

1. A processing apparatus comprising:
   input means for inputting color image information, said input means inputting a plurality of color component signals;
   a plurality of processing means for processing each color component signal by mixing said plurality of color component signals at a rate corresponding to a predetermined constant; and
   comparison means for comparing a level of each color component signal, processed by said processing means, with a predetermined value,
   wherein said plurality of processing means changes the constant in accordance with the results of the comparison by said comparison means.

2. A processing apparatus according to claim 1, wherein said input means includes a plurality of input units and said comparison means compares the level of each color component signal with a corresponding predetermined value for each color of said plurality of input units.

3. A processing apparatus according to claim 2, wherein each of said input unit includes a reader for reading a color image.

4. A processing apparatus according to claim 3, wherein said apparatus is for processing an original document and said readers are arranged in a predetermined direction of the original document.

5. A processing apparatus according to claim 1, wherein each of said color component signals represents density information for each color component.

6. An apparatus comprising:
   a plurality of converting sensor parts for converting a color image into a plurality of color component signals by dividing the color image into different portions, each of said sensor parts having plural kinds of color filters and respectively converting the different portions of the color image;
   means for simultaneously correcting a color balance among the respective output color component signals output from said plurality of sensor parts; and
   control means for controlling said correcting means such that the color balance of the output color component signals corresponding to at least two of said plurality of sensor parts being substantially the same.

7. An apparatus according to claim 6, wherein said control means includes means for comparing a plurality of output levels of said sensor parts with a common predetermined level.

8. An apparatus according to claim 7, wherein said correcting means corrects the color balance in accordance with a compared result of said comparing means.

9. An apparatus according to claim 6, wherein said plurality of converting sensor parts respectively have color filters having the same transmittance characteristics.

10. An apparatus according to claim 9, wherein said color filters include red, green and blue filters.

11. An apparatus according to claim 6, wherein said correcting means performs correction by mixing said plurality of color component signals.

12. An apparatus according to claim 6, wherein said apparatus is for processing an original document, and said plurality of sensor parts are arranged in a predetermined direction of the original document.

13. An apparatus according to claim 6, further comprising:
    means for reproducing as a visible image the color component signals, the color balance of which is controlled by said control means.

14. An apparatus according to claim 13, wherein said reproducing means includes printing means.

15. A color image pickup apparatus comprising:
    (a) means for converting a color image into a plurality of color component signals by dividing the color image into different portions, said converting means being divided into a plurality of sensing parts, and each part having plural kinds of color filters, and said plurality of sensing parts converting the different portions of the color image;
    (b) means for readng said plurality of color component signals from said converting means;
    (c) means for causing said reading means to operate when said converting means converts a predetermined color image;
    (d) means for detecting a level corresponding to said color component signal; and
    (e) means for simultaneously controlling a color balance of said plurality of color component signals in accordance with a detection by said detecting means, such that the color balance of the respective color component signals of each of said plurality of sensing parts being substantially the same.

16. An apparatus according to claim 15, wherein said plurality of sensing parts are arranged in a predetermined direction.

17. An apparatus according to claim 15, wherein said plurality of sensing parts respectively have color filters having the same transmittance characteristic.

18. An apparatus according to claim 17, wherein said color filters include red, green and blue filters.

19. An apparatus according to claim 15, wherein said controlling means includes mixing means for mixing at least two of said plurality of color component signals at a predetermined rate.

20. An apparatus according to claim 15, wherein said predetermined color image is a predetermined color portion of a document.

21. An apparatus according to claim 15, further comprising:
    means for reproducing as a visible image the color component signals the color balance of which is controlled by said control means.

22. An apparatus according to claim 21, wherein said reproducing means includes printing means.

23. A color image information processing apparatus comprising:
    (a) a plurality of input units for inputting color image information, each of said units inputting a plurality of color component signals and said plurality of input units respectively inputting the plurality of color component signals which are obtained by respectively dividing different portions of a color image; and (b) adjust means for simultaneously correcting the color component signals output from said plurality of input units, said adjust means performing correction using a common reference value with respect to said plurality of input units.

24. An information processing apparatus according to claim 23, wherein said adjust means performs adjust in accordance with a comparison result between said color component signals and said reference value.

25. An information processing apparatus according to claim 23, further comprising:

(c) indication means for indicating adjustment of said adjust means.

26. An information processing apparatus according to claim 23, wherein each of said input units is a color sensor for converting radiation into said color component signals.

27. An information processing apparatus according to claim 23, wherein said adjust means further comprises mixing means for mixing said plurality of color component signals at an initial predetermined rate so as to adjust said color component signals by subsequently changing the initial rate.

28. An information processing apparatus according to claim 23, further comprising:

means for reproducing as a visible image the color component signals, the color balance of which is controlled by said control means.

29. An information processing apparatus according to claim 28, wherein said reproducing means includes printing means.

30. An information processing apparatus according to claim 23, wherein at least one of said input units inputs a dot sequential color component signal.

31. An information processing apparatus according to claim 30, wherein said plurality of input units input a dot sequential color component signal.

* * * * *

UNITED STATES PATENT AND TRADEMARK OFFICE
CERTIFICATE OF CORRECTION

PATENT NO. : 4,907,076
DATED : March 6, 1990
INVENTOR(S) : HIDEFUMI OHSAWA

It is certified that error appears in the above-identified patent and that said Letters Patent is hereby corrected as shown below:

Title page:

IN [56] REFERENCES CITED

U.S. PATENT DOCUMENTS, "557,940  12/1883" should read --06/557,940  12/18/83--.

COLUMN 2

Line 50, "Dg Db" should read --Dg and Db--.

COLUMN 3

Line 58, "$E_g$ and $D_b$," should read --$D_g$ and $D_b$,--.

COLUMN 4

Line 40, "8-bit data" should read --8-bit digital data--.

COLUMN 5

Line 13, "We claim:" should read --I claim:--.
    Line 35, "input unit" should read --input units--.

COLUMN 6

Line 27, "readng" should read --reading--.

UNITED STATES PATENT AND TRADEMARK OFFICE
CERTIFICATE OF CORRECTION

PATENT NO. : 4,907,076

DATED : March 6, 1990

INVENTOR(S) : HIDEFUMI OHSAWA

It is certified that error appears in the above-identified patent and that said Letters Patent is hereby corrected as shown below:

COLUMN 7

Line 10, "adjust" (second occurrence) should read --adjustment--.

Signed and Sealed this

Twenty-sixth Day of November, 1991

Attest:

HARRY F. MANBECK, JR.

Attesting Officer      Commissioner of Patents and Trademarks